(12) United States Patent
Kleyman et al.

(10) Patent No.: US 12,018,384 B2
(45) Date of Patent: Jun. 25, 2024

(54) THIN AND TEXTURIZED FILMS HAVING FULLY UNIFORM COVERAGE OF A NON-SMOOTH SURFACE DERIVED FROM AN ADDITIVE OVERLAYING PROCESS

(71) Applicants: Ardy S Kleyman, Carmel, IN (US); Daming Wang, Carmel, IN (US); Kasey Hughes, Crawfordsville, IN (US)

(72) Inventors: Ardy S Kleyman, Carmel, IN (US); Daming Wang, Carmel, IN (US); Kasey Hughes, Crawfordsville, IN (US)

(73) Assignee: Praxair S.T. Technology, Inc., North Haven, CT (US)

( * ) Notice: Subject to any disclaimer, the term of this patent is extended or adjusted under 35 U.S.C. 154(b) by 98 days.

(21) Appl. No.: 17/950,209

(22) Filed: Sep. 22, 2022

(65) Prior Publication Data

US 2023/0015719 A1 Jan. 19, 2023

Related U.S. Application Data

(62) Division of application No. 16/003,278, filed on Jun. 8, 2018, now Pat. No. 11,479,841.

(Continued)

(51) Int. Cl.
*C23C 4/12* (2016.01)
*B32B 3/30* (2006.01)
(Continued)

(52) U.S. Cl.
CPC .................. *C23C 4/12* (2013.01); *B32B 3/30* (2013.01); *C23C 4/04* (2013.01); *C23C 4/067* (2016.01); *C23C 4/10* (2013.01); *C23C 4/129* (2016.01)

(58) Field of Classification Search
CPC .................................. C23C 4/12; C23C 4/10
See application file for complete search history.

(56) References Cited

U.S. PATENT DOCUMENTS

| 4,787,837 A | 11/1988 | Bell |
| 5,252,360 A | 10/1993 | Hiittl et al. |

(Continued)

FOREIGN PATENT DOCUMENTS

| EP | 0256803 A2 | 2/1988 |
| JP | 2000301302 A | 10/2000 |
| WO | 2017208998 A1 | 12/2017 |

OTHER PUBLICATIONS

Andreas Killinger et al.; High-Velocity Suspension Flame Spraying (HVSFS), a new approach for spraying nanoparticles with hypersonic speed; Elsevier, ScienceDirect, Surface & Coatings Technology 201 (2006) pp. 1922-1929; available online at www.sciencedirect.com.

(Continued)

*Primary Examiner* — Nathan T Leong

(57) ABSTRACT

This invention relates to a thin and texturized film that can be applied onto a non-smooth surface to improve hardness, corrosion resistance and wear resistance properties of the surface while maintaining the underlying profile of the non-smooth surface. An additive overlaying process can be employed to produce the thin and texturized film on the non-smooth surfaces without substantial alteration or degradation of the underlying surface texture or profile of the non-smooth surfaces so as to sufficiently preserve the underlying surface texture or profile. The thin and texturized film fully covers the non-smooth in a uniform manner and maintains the surface profile.

5 Claims, 3 Drawing Sheets

Related U.S. Application Data

(60) Provisional application No. 62/521,708, filed on Jun. 19, 2017.

(51) Int. Cl.
*C23C 4/04* (2006.01)
*C23C 4/067* (2016.01)
*C23C 4/10* (2016.01)
*C23C 4/129* (2016.01)

(56) References Cited

U.S. PATENT DOCUMENTS

| | | |
|---|---|---|
| 6,447,848 B1 * | 9/2002 | Chow .................. C23C 4/134 427/446 |
| 7,201,850 B2 | 4/2007 | Kawanishi et al. |
| 8,629,371 B2 * | 1/2014 | Oberste-Berghaus ...................... H01M 4/886 219/121.48 |
| 2002/0116876 A1 | 8/2002 | Suzuki et al. |
| 2003/0045412 A1 | 3/2003 | Schulz et al. |
| 2005/0159281 A1 | 7/2005 | Nishino et al. |
| 2008/0072790 A1 | 3/2008 | Ma et al. |

OTHER PUBLICATIONS

Toma, FL. et al. Demands, Potentials, and Economic Aspects of Thermal Spraying with Suspensions: A Critical Review. J Therm Spray Tech 24, 1143-1152 (2015). https://doi.org/10.1007/s11666-015-0274-7.

\* cited by examiner

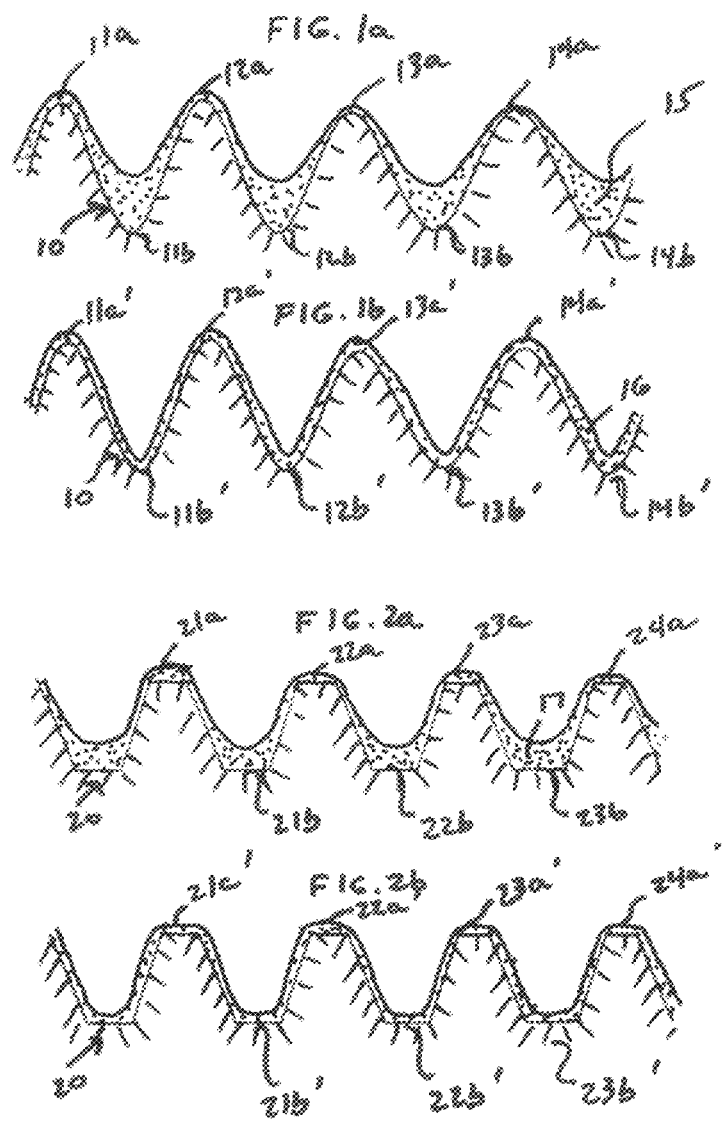

THIN AND TEXTURIZED FILMS HAVING FULLY UNIFORM COVERAGE OF A NON-SMOOTH SURFACE DERIVED FROM AN ADDITIVE OVERLAYING PROCESS

CROSS REFERENCE TO RELATED APPLICATION(S)

This application claims the benefit of non-provisional application Ser. No. 16/003,278, filed Jun. 8, 2018, which claims the benefit of provisional application Ser. No. 62/521,708, filed Jun. 19, 2017, entitled THIN AND TEXTURIZED FILMS HAVING FULLY UNIFORM COVERAGE OF A NON-SMOOTH SURFACE DERIVED FROM AN ADDITIVE OVERLAYING PROCESS.

FIELD OF THE INVENTION

This invention relates to a continuous thin and texturized film applied onto non-smooth surfaces for use in a variety of applications, whereby the film sufficiently retains the underlying surface texture of the non-smooth surface being overlayed onto the underlying surface texture.

BACKGROUND OF THE INVENTION

Many coated substrate surfaces require a coating that maintains or does not significantly degrade the underlying surface texture or patterning of the substrate surface. It should be understood that the terms "texture"; "surface texture" and "pattern" are intended to have the same meaning as used herein and throughout. As used herein and throughout, the term "substrate" refers to any non-smooth surface characterized by a certain random or non-random surface pattern or texturized profile. The substrate includes any suitable type of material, including metallic and alloy surfaces.

One example of a substrate is an embossing roll which has a configuration of depressions or grooves and/or elevated protrusions to create a certain pattern or surface texture. Another example of a substrate is a work roll with a pre-defined surface texture. For example, work rolls for use in metal or metal alloys (e.g., steel, titanium, copper, brass and aluminum, having a certain surface texture may be needed to produce rolled workpieces and other products. As used herein and throughout, "workpiece" and "product" are generic references to any type of material that the coated substrate may contact as part of a rolling process or end-use application (e.g., heat treatment, annealing and the like) including by way of example, a strip, slab or other rolled sheet metals and other sheet products. A textured work roll for hot mill and cold mill performing has certain benefits, including enabling significant reductions in the thickness of the workpiece material passing through the work roll.

Further, the work roll surface texture is desirable as it can act to entrap lubricant in what is otherwise a lubricant-depleted roll bite (the depletion of lubricant resulting from the extreme temperatures associated with hot rolling), such lubricant then being expelled to the roll/slab interface upon which time it acts to substantially minimize material transference due to adhesion between the roll surfaces and the slab surfaces and minimizes rolled-in debris and smudge on the slab surface as it enters the cold rolling stands.

Still further, large cold mill and temper mill work rolls used in the production of sheet steel are required to be endowed with a closely defined textured surface. This texture is then imparted to the sheet steel as it passes through the rolls. As the sheet is subsequently formed into some required profile, for example, a car body shell, the surface texture that it possesses play a highly significant part, firstly in the lubrication by oil that is needed during its pressing, and subsequently in the painting of the metal shell. It is known in the art that certain qualities of surface roughness and lubrication are needed in the press working of sheet steel for the car industry and other applications as well.

Many coating processes have been employed, but they fail to create suitable wear life. One example is hard chrome plating processes, which are prevalently utilized today. However, a major drawback of the hard chrome-plating process is that it uses hexavalent chromium. Due to its carcinogenic properties, the unauthorized use of Cr(VI) compounds will be banned in the European Union from September 2017 under the Regulation on Registration, Evaluation, Authorization and Restriction of Chemicals (REACH).

As an alternative, electrical discharge coatings (EDC's) have been explored, which create texturing of the underlying surface while depositing a coating onto the work piece surface. EDC is a surface alloying/coating process for making a hard and wear-resistant layer with an electrical discharge textured surface on a metallic substrate. Green compact and/or sintered metal-carbide electrodes have been used during electrical discharge texturing to improve roll wear resistance through surface alloying. During the EDC process, an electrical current flows through the electrode and causes ionization of the dielectric in the sparking gap. During ionization, temperatures of more than 8000K will occur, at which point local melting and vaporization of the electrode and the workpiece surface takes place to create a coated surface. The results tend to show unacceptably low levels of tungsten carbide deposited on the workpiece surface, thereby resulting in poor wear resistance.

Still further, other current coating processes are generally unable to preserve the underlying surface texture or profile of a non-smooth surface. Today, when a coating is applied to a non-smooth surface which can be generated, for example, by texturing, embossing, engraving, etching or knurling, the non-uniform surface is lost when a thick protective coating is deposited thereon.

In view of the drawback of current coating processes, there remains a need for improved coatings and processes for producing the same that can coat non-smooth substrate surfaces to a film content sufficient to impart protective wear resistance and not impart substantial degradation of the underlying surface texture or profile of the non-smooth surfaces, thereby sufficiently preserving the underlying surface texture or profile.

SUMMARY OF THE INVENTION

In one aspect, a texturized and thin film is provided, comprising: a substrate comprising a non-smooth surface characterized by a pattern, said pattern having a predetermined number of peaks and valleys; the texturized and thin film continuously extending along the entire non-smooth surface, said textured, thin film derived from a liquid feedstock of particulates fed through an additive overlaying device, said particulates having an effective diameter no greater than about 5 microns; said texturized and thin coating having a minimum thickness and a maximum thickness no greater than about 25 microns, such that the ratio of the minimum thickness to the maximum thickness ranges from about 0.6 to about 1.0, thereby creating a film texture that substantially conforms to the pattern of the non-smooth surface.

In a second aspect, a texturized and thin film is provided, comprising: a substrate comprising a non-smooth surface characterized by a pattern, said pattern characterized by a contoured profile defined by a predetermined number of peaks and valleys; the texturized and thin film continuously extending along the entire non-smooth surface to create (i) coated peaks each of which conform to said contoured profile of said corresponding peaks of non-smooth surface, and (ii) coated valleys each of which confirm to the contoured profile of said corresponding valleys of the non-smooth surface said textured and thin film derived from a liquid feedstock particulates fed through an additive overlaying device; said texturized and thin film having a minimum thickness and a maximum thickness no greater than about 25 microns, such that the ratio of the minimum thickness to the maximum thickness ranges from about 0.6 to about 1.0.

In a third aspect, a method for creating a fully covered substrate along an outer surface of the substrate without substantial alteration or degradation of a texture profile of the outer surface of the substrate, said method comprising the steps of: providing the substrate with the outer surface, said outer surface having a pattern characterized as being non-smooth as defined by the texture profile; providing an additive overlaying device, said additive overlaying device comprising a combustion chamber and a nozzle; generating a hot gas effluent; feeding a liquid feedstock of particulates into the hot gas effluent, said particulates having a size ranging from 0.1 to 5 microns; producing a molten particulate effluent; and directing the molten particulate effluent onto the non-smooth texture profile to produce a textured film that substantially conforms to the pattern of the non-smooth surface.

BRIEF DESCRIPTION OF THE DRAWINGS

FIG. 1a shows a non-smooth top surface of a substrate having a conventionally thermal sprayed coating therealong in which the coating thickness along the peaks and valleys of the non-smooth surface is non-uniform and the underlying texture is degraded;

FIG. 1b shows the non-smooth top surface of the same substrate of FIG. 1a having a thin and texturized film extending continuously along the peak and valleys with uniform coverage and thickness in accordance with the principles of the present invention, whereby the thin and texturized film is derived from an additive overlaying process;

FIG. 2a shows another example of a non-smooth top surface of a substrate having a conventionally thermal sprayed coating therealong in which the coating thickness along the peaks and valleys of the non-smooth surface is non-uniform and the underlying texture is degraded;

FIG. 2b shows the non-smooth top surface of the same substrate of FIG. 2a having a thin and texturized film extending continuously along the peak and valleys with uniform coverage and thickness in accordance with the principles of the present invention, whereby the thin and texturized film is derived from an additive overlaying process;

DETAILED DESCRIPTION OF THE INVENTION

Figure 3:
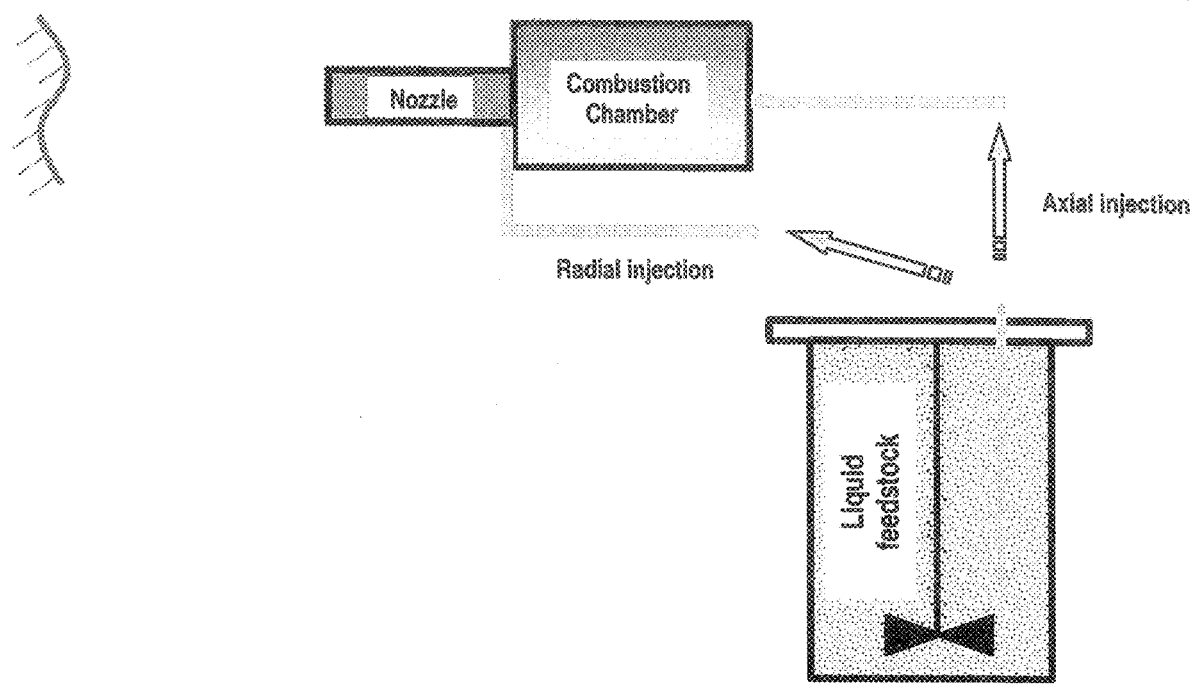
FIG. 3 shows a representative schematic of a system for an additive overlaying process.

The present invention recognizes that when a thermal sprayed coating is applied onto a non-smooth surface which can be generated by texturing, embossing, engraving, etching or knurling, the definition of the non-uniform surface (i.e., the surface texture, profile or pattern) is lost or covered by traditional thermal spray coating. The present invention offers a novel solution for overcoming disruption to the non-smooth surface while maintaining the necessary wear resistance of the non-smooth surface. The additive overlaying process preferably from a carbide feedstock with particle sizes ranging from about 0.1 to 5 microns can overcome the deficiencies of conventional thermal spray coatings by producing thin, texturized, dense and wear-resistant films.

One aspect of the present invention focuses on a film that can generally create the desired wear and corrosion resistance while substantially maintaining the resultant underlying texture or pattern of the non-smooth substrate surface. The thin and texturized film is characterized by the absence of chrome plating or an EDC, and is derived from a liquid feedstock of particulates no greater than about 5 microns that is fed through an additive overlaying device.

It should be understood that the present invention can be utilized with any type of substrate having the need to retain the surface texture or pattern of the non-smooth surface can be employed. Various non-smooth substrates can be employed, including, embossing rolls, engraving rolls, etching rolls, knurling rolls, pinch rolls, calendar rolls, briquetting rolls, corrugating rolls, metering rolls, traction rolls, Godet rolls and crimping rolls. In a preferred embodiment, the substrate can be a work roll, such as that can be utilized in processes for rolling metal alloy (e.g., steel or aluminum alloy) or other non-metal workpieces.

The present invention recognizes the expected shortcomings of utilizing a dry powder to coat a non-smooth, texturized surface. In particular, FIG. 1a shows a dry powder-based coating 15 extending along a non-smooth surface 10. The non-smooth top surface 10 is shown in its entirety as having a representative non-smooth surface characterized by a pattern defined as a series of predetermined number of peaks and valleys. The top portion of the non-smooth top surface 10 is shown to be surface textured as a somewhat contoured profile that is substantially wave-like. It should be understood that the top surface 10 can have any other profile configuration. For purposes of simplicity, the non-smooth top surface 10 is not drawn to scale and the remainder of the non-smooth surface 10 has been intentionally omitted. Other details of the non-smooth surface 10 have been intentionally omitted to better clarify the principles of the present invention. The peaks as coated are designated as 11a-14a with corresponding valleys as coated designated as 11b-14b. Each of the peaks 11a-14a is shown as having equal height, and each of the valleys 11b-14b is shown as having equal depth. However, it should be understood that the present invention contemplates any configuration of peaks and valleys.

The present invention recognizes that the dry powder-based coating 15 has a tendency to accumulate more within the valleys 11b, 12b, 13b and 14b in comparison to the peaks 11a, 12a, 13a, 14a as a result of the relatively higher particle sizes which must be used to avoid agglomeration effects within a thermal spray device. As a result, the underlying pattern of the non-smooth surface 10 is lost because the deposition of the relatively larger sized molten powder particulates cannot be controlled to the degree required to attain substantially uniform coverage along the peaks 11a, 12a, 13a, 14a and valleys 11b, 12b, 13b and 14b. The dry powder-based coating 15 reduces the effects or diminishes the surface profile 10 by blunting the features of the valleys 11b-14b to disrupt the localized surface texture of the non-smooth surface 10. As such, the overall surface texture of the dry powder-based coating 15 is insufficient for the particular end-use application (e.g., embossing roll applications).

Alternatively, and in accordance with the principles of the present invention, FIG. 1b shows a texturized and thin film 16 derived from a liquid feedstock of solids no greater than 5 microns. The film 16 is fed through an additive overlaying device. The thin and texturized film 16 is uniformly deposited to create coated peaks 11a', 12a', 13a' and 14a' and coated valleys 11b', 12b', 13b' and 14b'. Additionally, the coverage of the peaks and valleys is substantially uniform and complete along the entire length of the non-smooth surface 10 such that the film 16 is characterized by a ratio of minimum thickness to maximum thickness from 0.6 to 1.0, preferably 0.7 to 1.0, and more preferably 0.8 to 1.0. FIG. 1b illustrates that the thin and texturized film 16 substantially conforms to the underlying pattern of the non-smooth surface 10. Specifically, the texturized and thin film 16 continuously extends along the entire non-smooth surface 10 to create (i) coated peaks 11a', 12a', 13a', and 14a', each of which conform to the contoured profile of the corresponding peaks of non-smooth surface 10, and (ii) coated valleys 11b', 12b', 13b', and 14b' each of which confirm to the contoured profile of the corresponding valleys of the non-smooth surface 10. The film 16 continuously extends along the non-smooth surface 10. The net result is that no valleys or peaks remain bare. The film 16 exhibits a thickness no greater than 25 microns, preferably 5-15 microns, and more preferably 5-10 microns.

Although the film can be significantly thinner than conventional thermal sprayed coatings applied onto contoured, non-smooth surfaces (e.g., FIG. 1a), coating 16 can still maintain or increase wear resistance of non-smooth surface 10. Film 16 of FIG. 1b is particularly advantageous when a particular application requires maximum surface coverage to generate maximum wear and corrosion resistance on complex geometries which have a texturized pattern without altering or degrading the underlying textured pattern.

The benefit of the present invention to other non-smooth surfaces may be employed. For example, FIG. 2b shows a non-smooth surface 20 having a substantially square-like wave pattern along its entire length. FIG. 2b shows a texturized and thin film 18 derived from a liquid feedstock of solid particulates no greater than 5 microns fed through an additive overlaying device. The thin and texturized film 18 is uniformly deposited to create coated peaks 21a', 22a', 23a' and 24a' and coated valleys 21b', 22b', 23b' and 24b'. Additionally, the coverage of the peaks and valleys is substantially uniform and complete along the entire length of the non-smooth surface 20 such that the film 18 is characterized by a ratio of minimum thickness to maximum thickness from 0.6 to 1.0, preferably 0.7 to 1.0, and more preferably 0.8 to 1.0.

FIG. 2b illustrates that the thin and texturized film 18 substantially conforms to the underlying pattern of the non-smooth surface 20 to maintain the underlying texture of the non-smooth surface 20. Specifically, the texturized and thin film 18 continuously extends along the entire non-smooth surface 20 to create (i) coated peaks 21a', 22a', 23a' and 24a', each of which conform to the contoured profile of the corresponding peaks of non-smooth surface 20, and (ii) coated valleys 21b', 22b', 23b' and 24b' each of which confirm to the contoured profile of the corresponding valleys of the non-smooth surface 20. The film 18 continuously extends along the non-smooth surface 20. The net result is that no valleys or peaks are left bare. The film 16 exhibits a thickness no greater than 25 microns, preferably 5-15 microns, and more preferably 5-10 microns.

In contrast, FIG. 2a shows that a dry powder-based coating 17 is not expected to produce uniform coverage along non-smooth surface 20. Similar to FIG. 1b, more coating 17 accumulates within the valleys than the peaks, such that the thickness of the coated valleys 21b, 22b and 23b are greater than the thickness of the coated peaks 21, 22a, 23a and 24a. The net result is that the coating is not texturized and does not substantially conform to the contour of the non-smooth surface 20, thereby alerting or degrading the underlying pattern of the non-smooth surface 20.

In one aspect of the present invention, the particulate size (i.e., effective diameter) is no greater than 5 micron, and preferably ranges from 0.1 to 3 micron, and more preferably 0.5 to 2.5 micron. The coating thickness in a preferred embodiment can range from 5 to 25 microns. The combination of these attributes can produce a surface roughness (Ra) of the texturized and thin film 16 and 20 that is preferably less than about 1.5 microns.

Surprisingly, the significant reduction in amount of the inventive film 16 and 18 of FIG. 1b and FIG. 2b, respectively, applied in comparison to thermally sprayed coatings does not diminish the hardness, wear resistance or corrosion resistant properties of the present invention. By way of example, in one embodiment, the inventive film 16 and 18 of FIG. 1b and FIG. 2b, respectively, contains a microhardness (HV300) that ranges from 900-1400, which is equivalent or better than that of typical hard chrome plated surfaces; along with minimal porosity of 0.5 vol % or less based on a total volume of the inventive film deposited along the non-smooth surface.

The thin and textured film of the present invention can impart such properties from a tungsten-carbide containing composition, including, by way of example, and not intending to be limiting, WC—CoCr, WC—Co, WC—Ni or CrC—NiCr. Tungsten-carbide containing films extend along the non-smooth surfaces with a carbide grain size preferably within a range of 0.05 to 1 microns. The corresponding feedstock for the tungsten-carbide compositions may be derived from sintered particulates or spray-dried sintered particulates; and the feedstock can include any suitable solvent, organic or inorganic, and in one preferred embodiment is an ethanol-based liquid. It should be understood that the thin and texturized film may also have other compositions derived from feedstock liquid suspension materials, which are suitable for imparting wear resistance, corrosion resistance and microhardness protective properties of the non-smooth surface of a substrate to withstand highly aggressive environments.

In another embodiment, the films can be derived from a liquid feedstock of nanosized powder particulates, which are sufficiently atomized to sub-micron particulates. The sub-micron particulates are deposited from an additive overlaying device in a substantially continuous and, preferably, monolayer coverage over each of the peaks and valleys of the non-smooth surface to produce a texturized and monolayer film along each of the peaks and valleys that may have a reduced thickness than previously described herein. The monolayer coverage lowers the amount of particulates contacting the non-smooth surface without unnecessarily wasting material. Further, the nanosized version of the films 16 and 18 of FIGS. 1b and 2b can enhance preservation of the underlying pattern of the non-smooth surface. As such, the overall surface texture of the partially coated substrate remains substantially unchanged. Selection of a monolayer coverage using a nanosized film or a build-up of multiple and discrete layers to produce a thin and texturized film may depend on the end-use application including the desired loading capacity. A higher loading capacity may warrant the build-up of multiple and discrete layers to produce the thin and texturized film.

The system and method for creating the inventive films uses an additive overlaying device having a combustion chamber that generates hot gas effluent. FIG. 3 shows a representative system and method in which the liquid feedstock with powder particulates are fed into a combustion chamber of an additive overlaying device to create a molten particulate effluent stream that can be directed to a non-smooth surface. The particulates of liquid feedstock having a size no greater than 5 microns are fed into the hot gas, thereby creating the effluent that can be directed onto the non-smooth surface in manner that conforms to the pattern of the non-smooth surface. The particulate size is no greater than 5 microns, thereby enabling the particulates to deposit in a manner such that the film has a thickness no greater than 25 microns along the non-smooth substrate, thereby allowing the film to substantially conform to the underlying pattern of the substrate.

Example 1

An additive overlaying device was used to produce a thin and texturized film onto a non-smooth metallic surface having a texturized profile. The ethanol based feedstock contained 20 wt % solids was prepared using fine particulates (a median particle size (d50) of 2.35 microns) with a nominal composition of 86 wt % WC-10 wt % Co-4 wt % Cr. The liquid feedstock was fed from a pot at 70 psi pressure and at a flow rate of 1 gallon/hour into the additive overlaying device and applied to the substrate at a 4 inch spray distance using a combustible mixture which was fed into the combustion chamber of the additive overlaying device.

Figure 4:
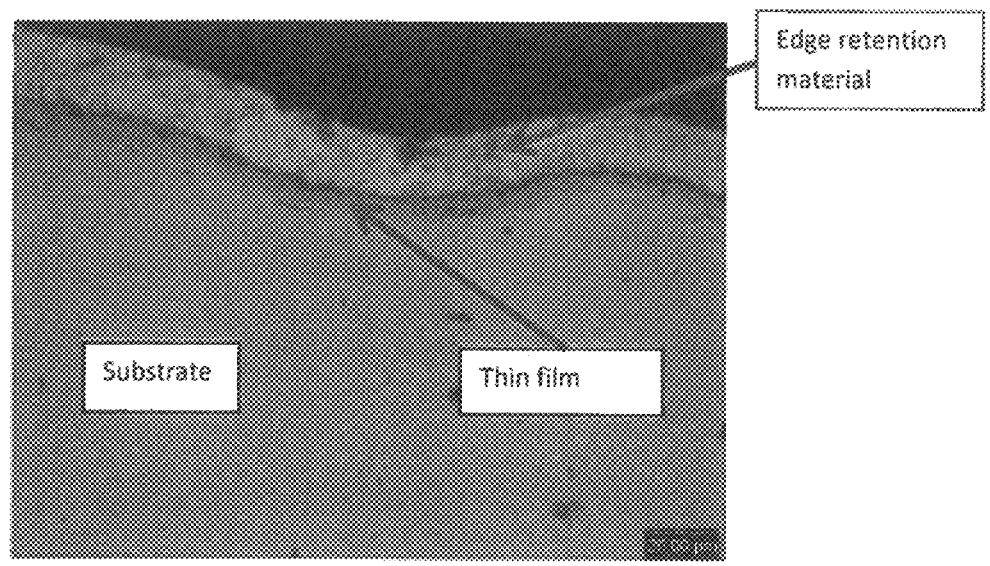
FIG. 4 shows a micrograph of a relatively thin and texturized film covering an entire non-smooth surface in a manner that substantially conforms to the underlying pattern of the non-smooth substrate, in accordance with the principles of the present invention.

The micrograph of FIG. 4 was obtained at 500× magnification, an illustrates upon visual inspection that a dense film microstructure achieved after 4 passes to create the as-deposited film thickness of less than 8 microns. The micrograph shows that the film substantially conforms to the contour of the non-smooth metallic surface. The entire metallic surface was determined by visual observation to be covered. No bare spots were detected.

While there has been shown and described what are considered to be preferred embodiments of the invention, it will, of course, be understood that various modifications and changes in form or detail could readily be made without departing from the spirit and scope of the invention. For example, the additive overlaying films and methods of applying as described herein can be applied directly or indirectly to a non-smooth surface of the substrate. Further, it should be understood that any type of substrate can be employed besides work rolls, including, by of example, and not intending to be limiting, embossing rolls, engraving rolls, etching rolls, knurling rolls, pinch rolls, calendar rolls, briquetting rolls, corrugating rolls, metering rolls, traction rolls, Godet rolls, crimping rolls. It is, therefore, intended that the invention be not limited to the exact form and detail herein shown and described, nor to anything less than the whole of the invention herein disclosed as hereinafter claimed.

The invention claimed is:

1. A method for creating a fully covered substrate along an outer surface of the substrate without substantial alteration or degradation of a texture profile of the outer surface of the substrate, said method comprising the steps of:
    providing the substrate with the outer surface, said outer surface having a pattern characterized as being non-smooth as defined by the texture profile;
    providing an additive overlaying device, said additive overlaying device comprising a combustion chamber and a nozzle;
    generating a hot gas effluent;
    feeding a liquid feedstock of particulates into the hot gas effluent, said particulates having a size ranging from 0.1 to 5 microns;
    producing a molten particulate effluent; and
    directing the molten particulate effluent onto the non-smooth texture profile to produce a textured film that substantially conforms to the pattern of the non-smooth surface.

2. The method of claim 1, further comprising:
    impinging said molten particulate effluent onto the substrate so as to extend in a continuous manner along the substrate.

3. The method of claim 1, further comprising accumulating the particulate effluent onto the substrate to a thickness no greater than 25 microns.

4. The method of claim 1, wherein the substrate is selected from the group consisting of work rolls, embossing rolls, engraving rolls, etching rolls, knurling rolls, pinch rolls, calendar rolls, briquetting rolls, corrugating roll, metering rolls, traction rolls, Godet rolls and crimping rolls.

5. The method of claim 1, further comprising directing the molten particulate effluent onto the non-smooth texture profile at an angle relative to the workpiece.

* * * * *